Aug. 4, 1959 C. MEGIBOW 2,897,561
FASTENER
Filed Nov. 10, 1954
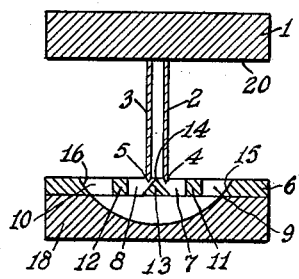
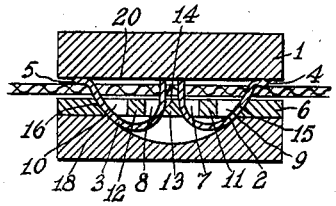
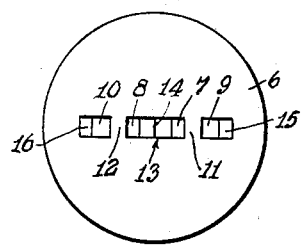
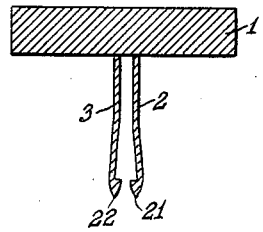
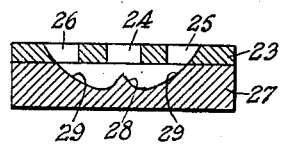
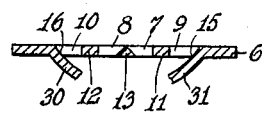
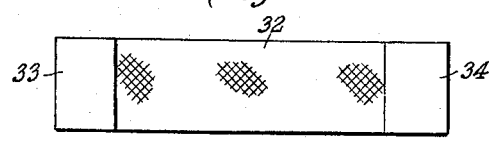
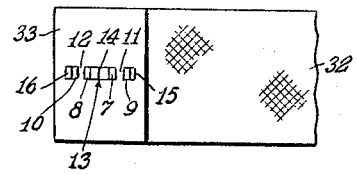
INVENTOR.
I. CHARLES MEGIBOW
BY
ATTORNEY.

United States Patent Office 2,897,561
Patented Aug. 4, 1959

2,897,561

FASTENER

Charles Megibow, Irvington, N.J.

Application November 10, 1954, Serial No. 468,020

2 Claims. (Cl. 24—95)

The present invention relates to new and useful improvements in fasteners and more particularly to a clip-fastener.

Fasteners such as snap-fasteners are generally known and comprise a pair of engaging members adapted to interlock with a snap-action. These fasteners are adapted by various constructional embodiments to provide for either easy disengagement or for permanent fastening. For example, in the selection of a fastener for a particular purpose the user has to compromise between an easily disengageable fastener or a permanently locking type fastener. While the easily disengageable type fasteners constitute an excellent fastening means where frequent locking and unlocking is desirable, the permanent locking fastener is preferred for use as button heads and the like. However, once a permanent type fastener has been applied, it is almost impossible to remove the fastener without substantial damage to a fabric to which the fastener has been locked.

It is an object of this invention to provide a clip fastener which is adapted for substantially semi-permanent locking, and which may be removed from a fabric and relocated if necessary without noticeable damage to the fabric. It is another object of the invention to provide a substantially semi-permanent clip-fastener especially applicable for use with fabrics, cloths, composition material and the like, but not limited thereto. It is a further object of this invention to provide a name tag or clasp incorporating the fastening means herein contemplated. Other objects and advantages of this invention will become apparent from the description hereinafter following and the drawings forming a part hereof, in which:

Figure 1 illustrates a cross-sectional view of clip-fastener components including an insert member and a receiving member according to the invention, Figure 2 illustrates a cross-sectional view of the clip-fastener of Figure 1 in locked position with a fabric positioned therebetween, Figure 3 shows a top elevational view of the insert receiving member, Figure 4 shows a cross-sectional view of a modified insert member, Figure 5 shows a cross-sectional view of a modified receiving member, Figure 6 shows a cross-sectional view of another modification of the receiving member, Figure 7 shows a front elevational view of a name tag according to this invention, and Figure 8 shows an enlarged fragmentary rear elevational view of a name tag embodying the clip-fastener of this invention.

The invention deals particularly with a clip-fastener comprising an insert member including a head having a pair of yieldably spaced-apart and readily bendable legs projecting therefrom which are cooperative in combination with a receiving member comprising a pair of receiving apertures having a spreader means therebetween, and guide means for directing the bending and positioning of the said legs upon insertion into said receiving member, whereby the said clip-fastener is capable of substantially semi-permanent fastening and being detachable with a pull sufficiently great to re-bend the said legs.

Figures 1 and 2 illustrate one form of the clip-fastener of this invention and comprises an insert member including head 1, e.g. a button head, disc, plate or the like, and a pair of yieldably spaced-apart substantially readily bendable legs 2 and 3 projecting therefrom. The legs 2 and 3 are preferably in a parallel relationship with respect to each other and are advantageously provided with sharp, pointed or tapered ends 4 and 5 adapted for piercing a fabric, cloth, or the like material. While the legs 2 and 3 may be secured to the head 1 in any manner as by welding, etc., they may also be integral therewith such as can be provided, for example, by blanking strip or sheet stock into a form consisting of a plate or disc with oppositely radiating arms and subsequently bending or otherwise forming the blank into a head 1 with the said legs projecting therefrom.

Cooperating with the above described insert member is a receiving member comprising a plate or disc 6 having a plurality of spaced apertures formed therethrough, said apertures being preferably in line or spaced relation with each other and comprising a pair of inner spaced apertures 7 and 8 and outer spaced apertures 9 and 10. Rib members 11 and 12 separate the inner apertures from the outer apertures and a spreader member 13 separates the inner apertures. The spreader member 13 is preferably but not necessarily in the form of a central rib positioned between the spaced ribs 11 and 12 and comprises a wedge or wedge-shaped body having its apex 14 in the direction of said insert member, and said outer apertures are provided with beveled or curved walls 15 and 16. A guide means is positioned rearwardly of the wedge 13 and comprises preferably a curved surface, for example, a curved surface of a grooved backing 18 secured to the rear surface of said disc or plate 6.

In application, according to Figure 3, a fabric, cloth, or composition material 19, e.g. paper, is placed between the insert member and the receiving member. The pointed or sharp ends 4 and 5 of the legs 2 and 3 are caused to penetrate the material 19 and engage the beveled or curved sides of the spreader 13, whereupon the said legs are caused to spread apart in opposite directions in passing through apertures 7 and 8, said spreading being increased as the head 1 approaches the receiving member until the ends of the legs 2 and 3 contact the curved or beveled guide means, said guide means acting to bend and to direct the legs into and through the outer apertures 9 and 10 along the beveled or curved walls 15 and 16 thereof. The legs pass beyond the said walls of the apertures upwardly and through the material 19. As the head 1 continues toward the receiving member, the under face 20 thereof contacts the extending or upwardly projecting ends of the legs 2 and 3 and presses them against the material 19 thereby securing said material between the insert and receiving members. In this manner the material 19 is substantially semi-permanently locked by means of said clip-fastener. However, should detachment of the clip-fastener become necessary, the head 1 is pulled outwardly against the restraining action of the ribs 11 and 12, which permit the legs to be extracted only by unbending of the leg material at least during the extracting period.

When certain materials 19 are employed which require a more permanent fastening action, the ends of the legs may be provided with grips 21 and 22, e.g. barbs and the like as illustrated by Figure 4, said grips acting to further restrain withdrawal of the legs from between the insert and receiving members.

Figure 5 illustrates a modification of the receiving member in that the plate or disc 23 comprises a substantially central aperture 24 instead of the spaced apertures 7 and 8 and spreader 13 as shown by Figures 1 and 2. The outer apertures 25 and 26 and the walls thereof are similar to the outer apertures 9 and 10 of Figures 1 and 2. However, the backing plate 27 is provided with a spreader member 28 in the form of a wedge on its grooved or channelled surface directly underneath or rearwardly of the central aperture 24. The guide portions 29 of the groove correspond with that shown by Figures 1, 2 and 3.

Figure 6 shows another modification of the receiving member substantially similar to that shown by plate 6 in Figures 1, 2 and 3, wherein like reference numerals indicate like structural embodiments, except that the backing plate 18 is eliminated and its function is served by providing guide means 30 and 31 simply by protruding the plate 6 to form the outer apertures 9 and 10 and the protruded tongues or tabs 30 and 31 serving as guide integrally communicating with the curved or beveled walls 15 and 16 of apertures 9 and 10, said tabs being bent or curved downwardly and in a position so that surfaces thereof receive the ends of the legs 2 and 3 after having been spread by the spreader 13 and which surfaces act to guide the legs 2 and 3 as hereinbefore described.

Having provided one of the clip-fastener forms above set forth, such clip-fastener, for example, may be applied in use as fasteners for name tags 32, and the like, as illustrated by Figures 7 and 8, wherein the name tag is provided with a strip 32 of cloth, etc., having end portions thereof secured between a pair of the clip-fasteners above described. In a preferred form of name tag, the ends of the strip 32 are bonded within or on plastic plates 33 and 34, said plates being in the form of the receiving members herein described, whereby said name tag may be applied to wearing apparel, etc., simply by inserting the insert member into locking position with the receiving member with the apparel material therebetween.

While name tags have been indicated as one use for the snap-fastener of this invention, it is apparent that the use of such fasteners is a general one and has utility for fastening a plurality of paper sheets and the like for use under conditions where the fastening preferred is a substantially semi-permanent fastening.

What I claim is:

1. A fastener comprising an insert member and a receiving member, said insert member having a head with a pair of yieldably spaced-apart and substantially readily bendable legs projecting therefrom in a common direction, said receiving member comprising a plate with a plurality of spaced apertures formed therein, a plurality of ribs separating said apertures, a spreader means between a pair of said ribs, and a guide means positioned rearwardly of said ribs and communicating with a pair of said spaced apertures, said guide means being protruded portions of said plate.

2. A fastener means according to claim 1, said legs having grip means on the end portions thereof.

References Cited in the file of this patent

UNITED STATES PATENTS

| | | |
|---|---|---|
| 799,997 | MacLellan | Sept. 19, 1905 |
| 906,052 | Murray | Dec. 8, 1908 |
| 1,035,080 | Brumberg | Aug. 6, 1912 |
| 1,988,233 | Berendt | Jan. 15, 1935 |